(12) United States Patent
Yarnot et al.

(10) Patent No.: US 11,795,963 B2
(45) Date of Patent: Oct. 24, 2023

(54) IMPELLER LOCKING COLLAR

(71) Applicant: ITT Manufacturing Enterprises LLC, Wilmington, DE (US)

(72) Inventors: Brian Alan Yarnot, Seneca Falls, NY (US); Cody Mac Arliss, Clyde, NY (US); Paul Matthew Landschoot, Jr., Phelps, NY (US); Douglas J. Nobles, Waterloo, NY (US); Kenneth Michael Smith, Apalachin, NY (US); Paul Walter Behnke, Newport Coast, CA (US)

(73) Assignee: ITT MANUFACTURING ENTERPRISES LLC, Wilmington, DE (US)

( * ) Notice: Subject to any disclaimer, the term of this patent is extended or adjusted under 35 U.S.C. 154(b) by 0 days.

(21) Appl. No.: 17/779,424

(22) PCT Filed: Dec. 12, 2019

(86) PCT No.: PCT/US2019/066075
§ 371 (c)(1),
(2) Date: May 24, 2022

(87) PCT Pub. No.: WO2021/118577
PCT Pub. Date: Jun. 17, 2021

(65) Prior Publication Data
US 2023/0003228 A1    Jan. 5, 2023

(51) Int. Cl.
*F04D 29/02* (2006.01)
*F04D 29/62* (2006.01)
*F04D 29/20* (2006.01)

(52) U.S. Cl.
CPC .......... *F04D 29/20* (2013.01); *F04D 29/628* (2013.01)

(58) Field of Classification Search
CPC ........ F04D 29/20; F04D 29/628; F16D 1/108; F16D 1/116; F16D 1/06
(Continued)

(56) References Cited

U.S. PATENT DOCUMENTS 1,129,139 A    2/1915  Georg
1,929,077 A *  10/1933 Rose .................... F04D 29/2205
                                                 415/199.2
(Continued)

FOREIGN PATENT DOCUMENTS

FR    2440468 A1    5/1980

OTHER PUBLICATIONS

International Search Report and Written Opinion for PCT Application No. PCT/US19/66075 dated Feb. 20, 2022.

*Primary Examiner* — Hoang M Nguyen
(74) *Attorney, Agent, or Firm* — Mannava & Kang, P.C.

(57) ABSTRACT

Technologies are generally described for holding an impeller of a pump assembly in place axially with an impeller locking collar by loading the collar against a ring element. In a centrifugal pump assembly, one side of the shaft has a larger diameter for the impeller to abut against. The other side of the shaft may be fitted with an impeller locking collar comprising two portions that can be threaded together and hold the impeller in place by tightening against a ring element such as a split ring or spiral lock. Anti-rotation to avoid loosening of the impeller locking collar may be achieved by providing counter threads against a shaft rotation. Secondary anti-rotation may be provided by one or more set screws in the impeller locking collar.

16 Claims, 4 Drawing Sheets

(58) Field of Classification Search
USPC .......................................................... 403/261
See application file for complete search history.

(56) References Cited

U.S. PATENT DOCUMENTS

| | | | |
|---|---|---|---|
| 3,061,342 A | 10/1962 | Feller | |
| 4,200,407 A * | 4/1980 | Bianco | B21B 31/07 |
| | | | 403/373 |
| 4,948,288 A | 8/1990 | Medgvesy | |
| 5,340,250 A | 8/1994 | Meriwether et al. | |
| 9,206,903 B2 | 12/2015 | Huard et al. | |
| 2013/0127121 A1 * | 5/2013 | Huard | F16J 15/164 |
| | | | 29/428 |

* cited by examiner

IMPELLER LOCKING COLLAR

CROSS-REFERENCE TO RELATED APPLICATIONS

The present application is a U.S. National Stage filing under 35 U.S.C. § 371 of International Application PCT/US19/66075, filed Dec. 12, 2019.

BACKGROUND

Unless otherwise indicated herein, the materials described in this section are not prior art to the claims in this application and are not admitted as prior art by inclusion in this section.

A centrifugal pump is rotating machine designed to move a fluid by transferring rotational energy through driven rotors to impellers. Fluid enters the centrifugal pump at an intake port, where the impeller is located. A driver is utilized to rotate a shaft that is connected to the impeller, thereby controlling the rotation of the impeller. The rotational motion of the impeller generates a centrifugal force that increases the velocity of the fluid so that the fluid flows through the pump casing to an outlet. At start up, a centrifugal pump has a flooded suction line surrounding the impeller with sufficient fluid to create a pressure differential and thus pumping the fluid.

While the main force acting on the impeller is the rotational force provided by the shaft of the pump, an axial thrust load may also be caused by unequal distribution of pressure between the front and back shrouds of the impeller. A radial impeller rotating in liquid produces a centrifugal effect, creating a discharge pressure. The difference between the discharge pressure and suction pressure causes axial thrust force to act on the impeller. In a multistage pump, axial thrust force may increase with the number of stages.

SUMMARY

The present disclosure generally describes an impeller locking collar to hold an impeller of a pump assembly in place axially by loading the collar against a ring element.

According to some examples, an impeller locking collar for a pump may include a first portion configured to be fitted around a shaft of the pump proximal to a base of an impeller of the pump, the first portion comprising a first set of threads facing the shaft; a second portion configured to be fitted around the shaft and partially between the first portion and the shaft, the second portion comprising a second set of threads facing the first portion and an indentation distal to the base of the impeller; and a ring element fitted around the shaft within the indentation of the second portion, the ring element configured to receive a thrust load of the impeller during an operation of the pump.

According to other examples, the impeller locking collar may further include at least one set screw fitted into a hole within the second portion, the at least one screw configured to secure the second portion to the shaft. The first set of threads may be male and the second set of threads may be female. Alternatively, the first set of threads may be female and the second set of threads may be male. The ring element may be a split ring, a retaining ring, or a spiral lock. The split ring may include two complementary parts configured to surround the shaft. A direction of the first set of threads and the second set of threads may be selected such that the first portion and the second portion move away from each other in response to a vibration of the shaft during an operation of the pump. At least a portion of the first portion, the second portion, and the ring element may be within a cavity of a head portion distinct from a waterway cavity of a pump casing to avoid exposure to fluids being transferred by the impeller.

According to further examples, a centrifugal pump assembly may include a casing; an impeller positioned within a first cavity of the casing and configured to transfer a fluid between and intake opening of the pump assembly and an output opening of the pump assembly; a shaft coupled to the impeller and configured to rotate the impeller to transfer the fluid between and intake opening of the pump assembly and an output opening of the pump assembly; and an impeller locking collar. The impeller locking collar may be fitted around the shaft in a second cavity of the casing to mitigate a residual thrust load of the impeller during an operation of the pump assembly, and include a first portion configured to be fitted around the shaft near a base of an impeller, the first portion comprising a first set of threads facing the shaft; a second portion configured to be fitted around the shaft and partially between the first portion and the shaft, the second portion comprising a second set of threads facing the first portion and an indentation distal to the base of the impeller; and a ring element fitted around the shaft within the indentation of the second portion, the ring element configured to receive a thrust load of the impeller during an operation of the pump assembly.

According to yet other examples, a diameter of the shaft on an opposite side of the impeller relative to the side with the impeller locking collar may be larger than a diameter of the shaft on the side of the impeller with the impeller locking collar. The pump assembly may be a multi-stage pump assembly and include another impeller coupled to the shaft in series with the impeller. The impeller locking collar may further include at least one set screw fitted into a hole within the second portion, the at least one screw configured to secure the second portion to the shaft. The ring element may be a split ring, a retaining ring, or a spiral lock. The split ring may include two complementary parts configured to surround the shaft. A direction of the first set of threads and the second set of threads may be selected such that the first portion and the second portion move toward each other in response to a vibration of the shaft during an operation of the pump assembly.

According to some examples, a method to maintain an axial position of an impeller in a pump is described. The method may include fitting a first portion of an impeller locking collar around a shaft of the pump proximal to a base of the impeller, the first portion comprising a first set of threads facing the shaft; fitting a second portion of the impeller locking collar around the shaft and partially between the first portion and the shaft by threading in the second portion, the second portion comprising a second set of threads facing the first portion and an indentation distal to the base of the impeller; positioning a ring element around the shaft within the indentation of the second portion; and threading out the second portion to push against the ring element such that the ring element receives a thrust load of the impeller during an operation of the pump.

According to other examples, the method may also include fitting at least one set screw into a hole within the second portion to secure the second portion to the shaft. Positioning the ring element around the shaft may include positioning a two-part split ring around the shaft. The method may further include fitting the first portion and the second portion within a cavity of a head portion distinct from a waterway cavity of a pump casing to avoid exposure to fluids being transferred by the impeller. The method may also include selecting a direction of the first set of threads and the second set of threads such that the first portion and the second portion move toward each other in response to a vibration of the shaft during an operation of the pump.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
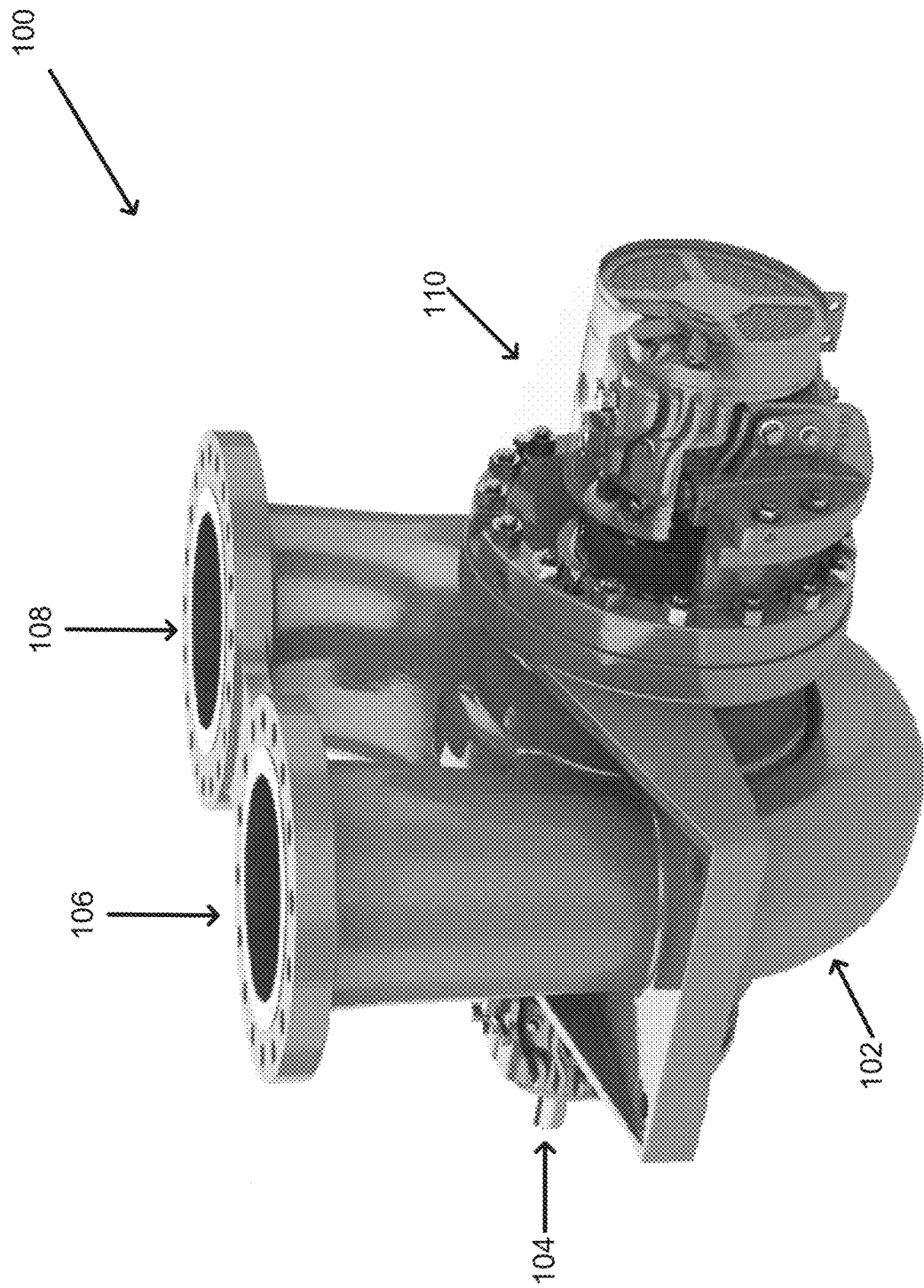
FIG. 1 illustrates an example single-stage, radially-split pump with an impeller, where an impeller locking collar may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems and/or devices related to holding an impeller of a pump assembly in place axially with an impeller locking collar by loading the collar against a ring element.

Briefly stated, technologies are generally described for holding an impeller of a pump assembly in place axially with an impeller locking collar by loading the collar against a ring element. In a centrifugal pump assembly, one side of the shaft has a larger diameter for the impeller to abut against. The other side of the shaft may be fitted with an impeller locking collar comprising two portions that can be threaded together and hold the impeller in place by tightening against a ring element such as a split ring or spiral lock. Anti-rotation to avoid loosening of the impeller locking collar may be achieved by providing counter threads against a shaft rotation. Secondary anti-rotation may be provided by one or more set screws in the impeller locking collar.

FIG. 1 illustrates an example single-stage, radially-split pump with an impeller, where an impeller locking collar may be implemented in accordance with at least some embodiments described herein.

As illustrated in FIG. 1, an example pump 100 may include a pump casing 102, a bearing housing 110, a shaft 104, an intake port 108, and an output port 106. In an operation, an external driver (not shown) coupled to the shaft 104 may rotate the shaft 104, which, in turn, may rotate an impeller inside the pump casing 102 transferring fluids from the intake port 108 to the output port 106.

Centrifugal pumps are used to transport fluids by the conversion of rotational kinetic energy to the hydrodynamic energy of the fluid flow. The rotational energy typically comes from an engine or electric motor (external driver). The fluid enters the pump impeller along or near to the rotating axis and is accelerated by the impeller, flowing radially outward into a diffuser or volute chamber (casing), from which it exits. A portion of the energy goes into kinetic energy of the fluid. Fluid enters axially through eye of the casing, is caught up in impeller blades, and is whirled tangentially and radially outward until it leaves through circumferential parts of the impeller into the diffuser part of the casing. The fluid gains both velocity and pressure while passing through the impeller.

An impeller is a rotating component of a centrifugal pump which transfers energy from the motor that drives the pump to the fluid being pumped by accelerating the fluid outwards from the center of rotation. The velocity achieved by the impeller transfers into pressure when the outward movement of the fluid is confined by the pump casing. A centrifugal pump may be single-stage or multi-stage. A pump containing two or more impellers is called a multi-stage centrifugal pump. The impellers may be mounted on the same shaft or on different shafts. At each stage, the fluid is directed to the center before making its way to the discharge on the outer diameter. For higher pressures at the outlet, impellers can be connected in series. For higher flow output, impellers can be connected in parallel.

An example centrifugal pump according to the present disclosure may include impeller locking collar assembly that holds the impeller in place axially by loading the impeller locking collar against a split ring. The impeller locking collar may be threaded to allow for installation and adjustment against the split ring. Anti-rotation to avoid loosening of the impeller locking collar during operation may be achieved by providing counter threads against the shaft rotation. Secondary anti-rotation may be provided by one or more set screws in the impeller locking collar.

Figure 2:
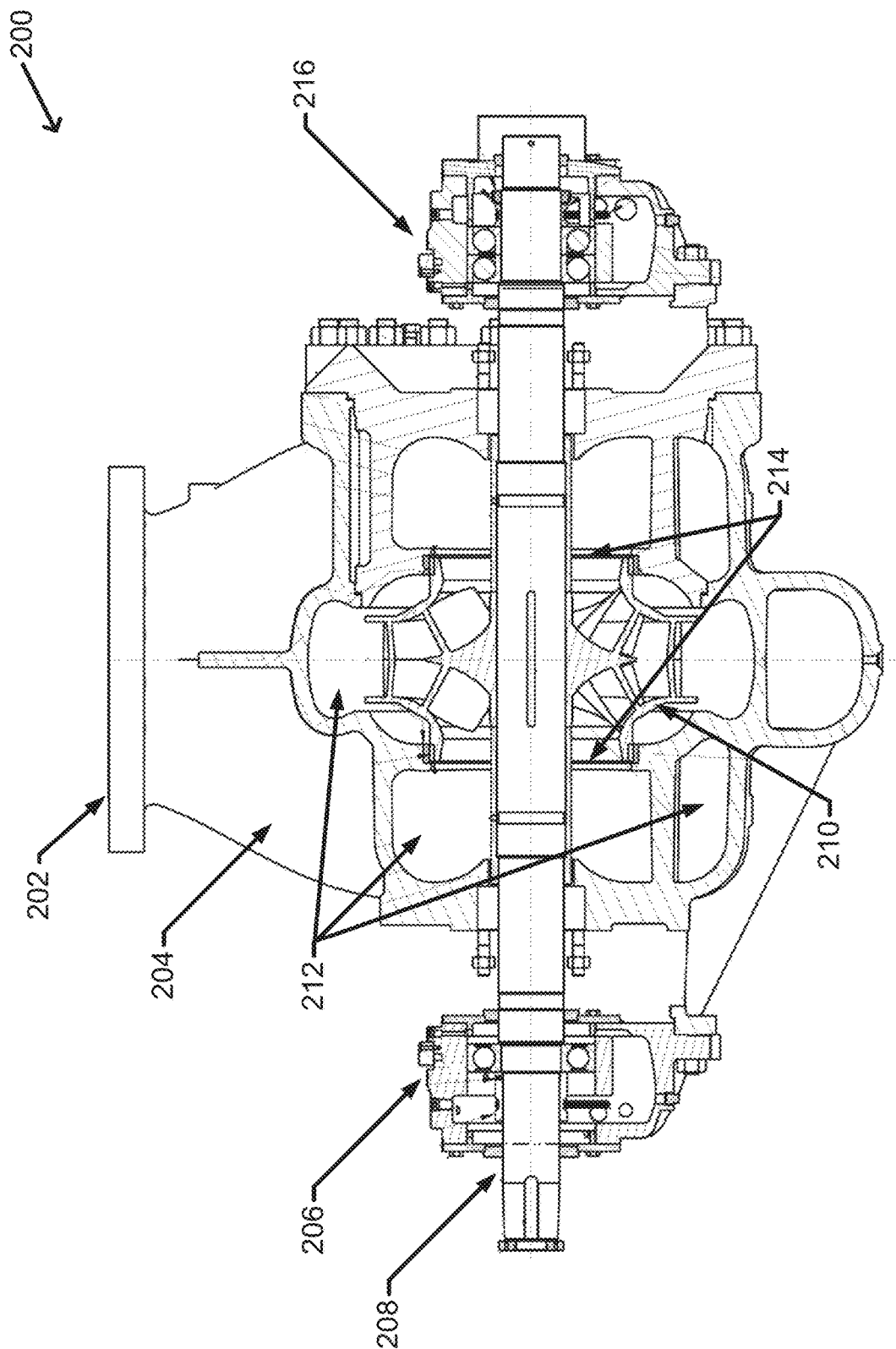
FIG. 2 illustrates a cross-sectional cutaway view of a single-stage pump with an impeller.

FIG. 2 illustrates a cross-sectional cutaway view of a single-stage pump with an impeller.

As illustrated, an example single-stage pump 200 may include a port 202 (intake or output), a casing 204, a first bearing housing 206, a shaft 208, an impeller 210, cavities 212 within the casing 204, wear rings 214, and second bearing housing 216.

In an operation, fluids may enter axially through an intake port 202, and pushed tangentially and radially outward until leaving through circumferential parts of the impeller 210 into the diffuser part of the casing 204. The fluids may gain both velocity and pressure while passing through the impeller 210. In some case, the first bearing housing 206 may contain radial bearings and the second bearing housing 216 may include axial (thrust) bearings. The wear rings 214 may be used to stabilize the impeller 210.

In operation, the impeller 210 is subject to different forces. While an ideal impeller would only receive rotational force from the shaft 208, axial thrust caused by unequal distribution of pressure between the front and back shrouds of an impeller (difference between the discharge pressure and suction pressure) may result in the impeller being pushed transversally to the shaft axis. The axial thrust load may result in vibration and loss of power transmission, as well as reduce expected life of pump bearings (and/or shaft). Some pump systems may include an impeller locknut secured through threads on the shaft near the impeller, which may result in reliability issues due to bending moment and stress. The threads may form a stress concentration that may lead to premature fatigue failure of the shaft 208. Other systems may load the impeller with a thrust load to push the impeller against the shaft 208, but this approach may involve custom machined parts (wear rings), etc. adding to pump assembly complexity and thereby reducing reliability.

Figure 3:
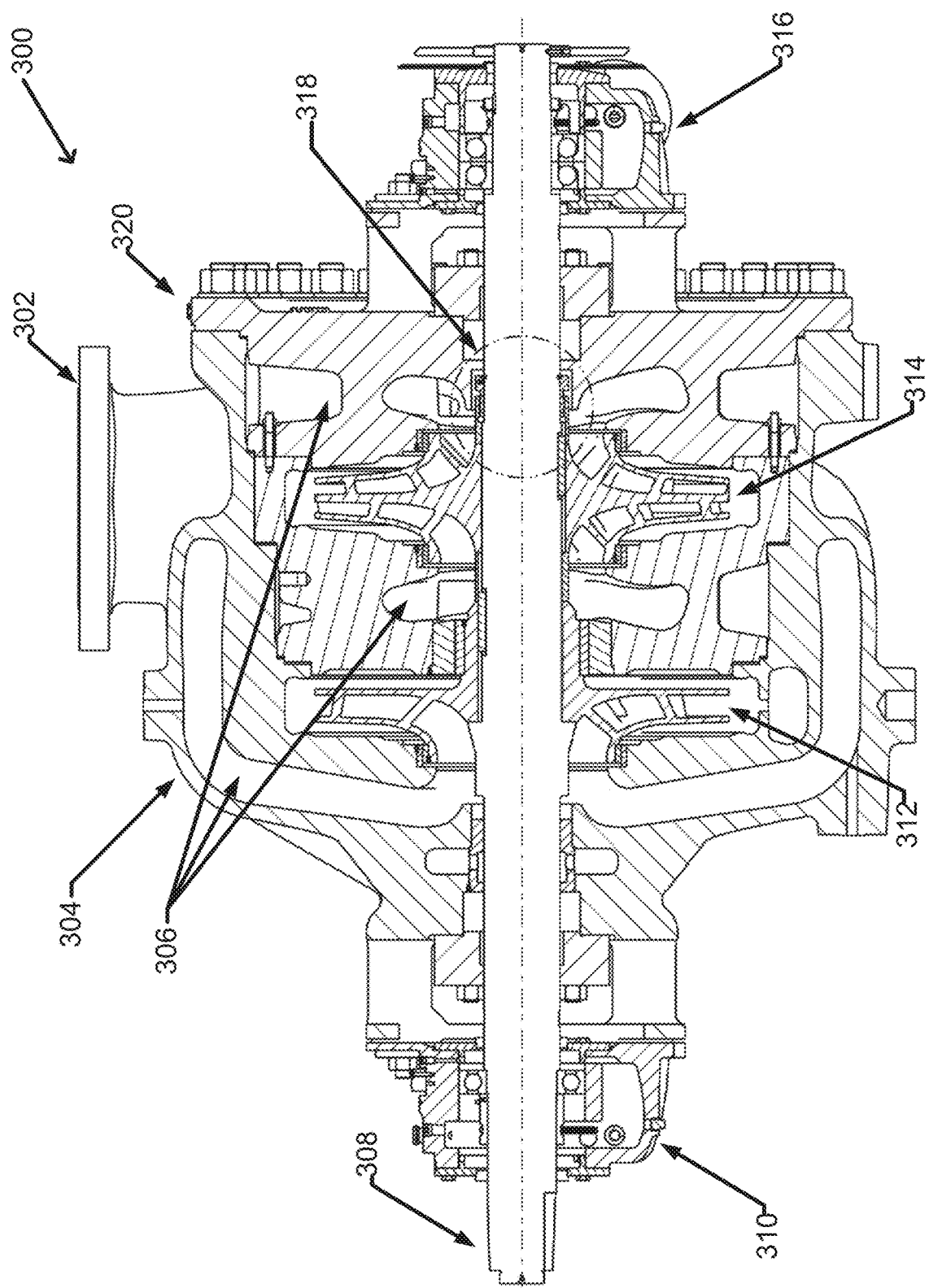
FIG. 3 illustrates a cross-sectional cutaway view of a two-stage pump with an impeller locking collar.

FIG. 3 illustrates a cross-sectional cutaway view of a two-stage pump with an impeller locking collar, arranged in accordance with at least some embodiments described herein.

The example two-stage pump 300 in FIG. 3 includes a port 302 (intake or output), a casing 304, a first bearing housing 310, a shaft 308, a first stage impeller 314, a second stage impeller 312, cavities 306 within the casing 304, a head 320 portion of the casing 304, a second bearing housing 316, and impeller locking collar 318. The first bearing housing 310 may be a radial bearing housing and include deep-row radial ball bearings near the impeller. The second bearing housing 316 may be axial (thrust) bearing housing and include back-to-back mounted angular contact bearings on the thrust side. Although called thrust bearing, bearings at the thrust location in pumps may typically absorb loads in both the axial and radial directions.

Major components of a centrifugal pump assembly according to some examples, may include the casing 304, an impeller (e.g., impeller 314) positioned within a first cavity of the casing, and a shaft coupled to the impeller and configured to rotate the impeller to transfer a fluid between an intake opening of the pump assembly and an output opening of the pump assembly. The impeller may be configured to transfer the fluid between the intake opening of the pump assembly and the output opening of the pump assembly. The pump assembly may also include an impeller locking collar 318. The impeller locking collar 318 may be fitted around the shaft 308 to mitigate a residual thrust load of the impeller during an operation of the pump assembly. The impeller locking collar 318 include a first portion (a female impeller piece) configured to be fitted around the shaft near a base of the impeller. The first portion may include a first set of threads facing the shaft. The impeller locking collar 318 may also include second portion configured to be fitted around the shaft and partially between the first portion and the shaft. The second portion may include a second set of threads facing the first portion and an indentation distal to the base of the impeller. A ring element may be fitted around the shaft within the indentation of the second portion. The first and second portions may hold the impeller in place by tightening against the ring element, which is configured to receive a thrust load of the impeller during an operation of the pump assembly.

In some examples, a diameter of the shaft on an opposite side of the impeller relative to the side with the impeller locking collar may be larger than a diameter of the shaft on the side of the impeller with the impeller locking collar such that the impeller can abut the larger diameter shaft portion.

A direction of the threads on the first and second portions of the impeller locking collar may be selected such that the first portion and the second portion move toward each other (tighten and not loosen) in response to a vibration of the shaft during an operation of the pump assembly. A secondary anti-rotation mechanism may include at least one set screw fitted into a hole within the second portion of the impeller locking collar and securing the second portion to the shaft.

While examples are discussed using specific pump designs herein, embodiments are not limited to the example configurations. An impeller locking collar to hold an impeller of a pump assembly in place axially by loading the collar against a ring element may be implemented in various pump types such as overhung pumps, single- or multi-stage pumps, axially split between bearing pumps, radially split barrel multi-stage pumps, vertical, double casing pumps, and similar ones. Embodiments may also be implemented in other forms of rotating machines that utilize a shaft and an impeller-like component subject to axial thrust.

Figure 4:
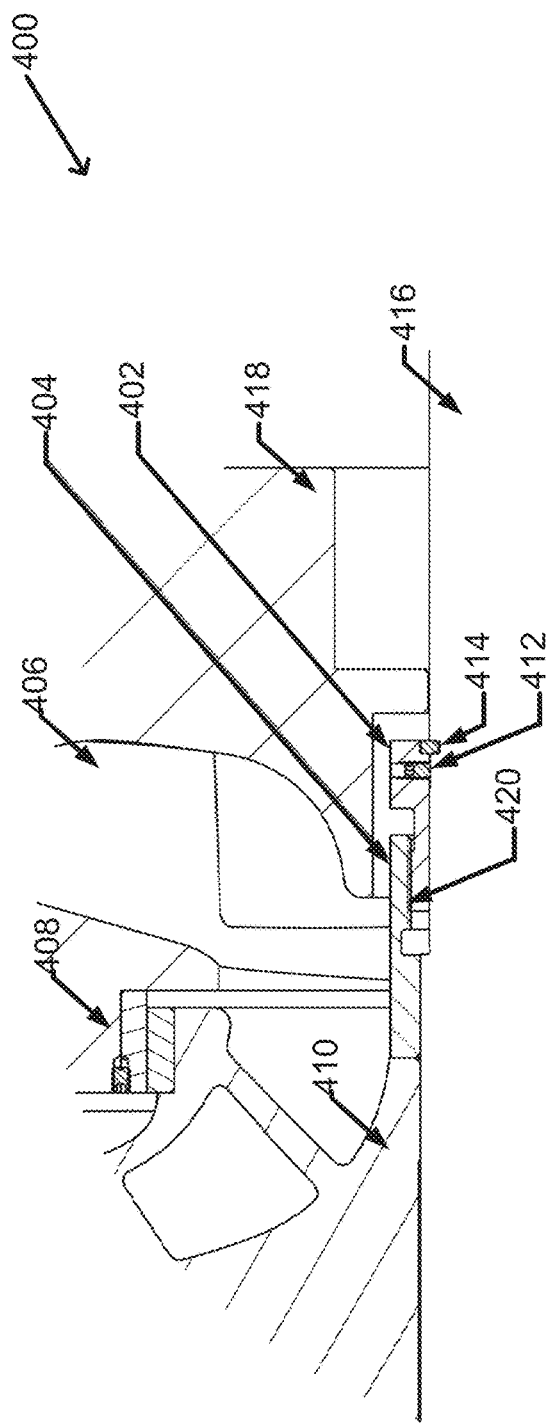
FIG. 4 illustrates a close-up, cross-sectional cutaway view of an impeller with an impeller locking collar, some of which arranged in accordance with at least some embodiments described herein.
Figure 4:
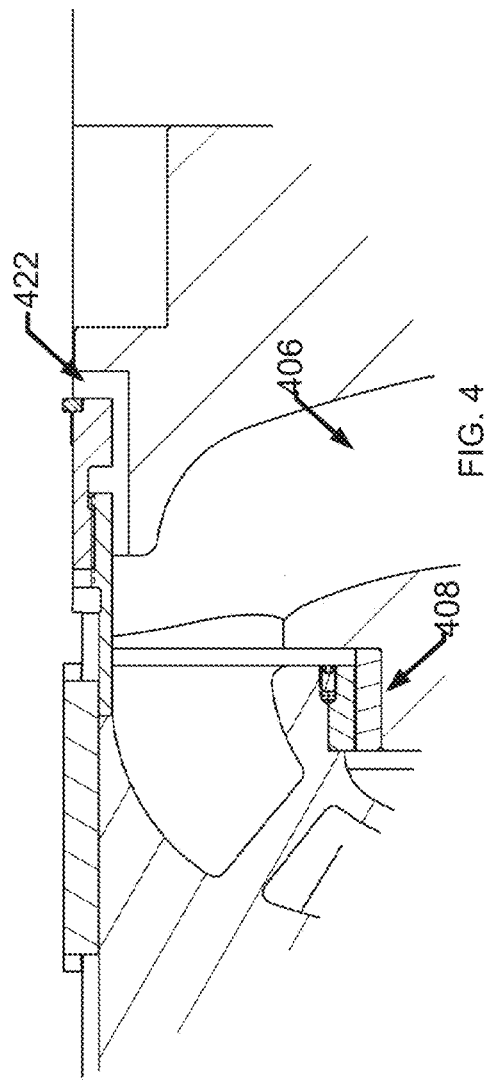

FIG. 4 illustrates a close-up, cross-sectional cutaway view of an impeller with an impeller locking collar, arranged in accordance with at least some embodiments described herein.

As illustrated in diagram 400, impeller 410 may be coupled to a shaft 416 and in a cavity 406 of the casing of the pump. An impeller locking collar as discussed herein may include a first portion 404 (e.g., a female collar piece), a second portion 402 (e.g., a male collar piece), and a ring element 414 housed in a second cavity 422 of a head portion 418 of the casing of the pump. The impeller locking collar may also include a set screw 412 and complementary threads 420 on opposing surfaces of the first portion and the second portion. Wear ring 408 may be one of a pair of wear rings on either side of the impeller 410 to help stabilize the impeller and reduce wear thereon.

The first portion 404 of the impeller locking collar may be configured to be fitted around a shaft of the pump proximal to a base of the impeller 410. The first portion 404 may include a first set of threads facing the shaft 416. The impeller locking collar may also include a second portion 402 configured to be fitted around the shaft 416 and partially between the first portion 404 and the shaft 416. The second portion may include a second set of threads facing the first portion 404 and an indentation distal to the base of the impeller 410. A ring element 414 fitted around the shaft 416 within the indentation of the second portion 402 may be arranged to receive a thrust load of the impeller 410 during an operation of the pump. The impeller locking collar may also include at least one set screw 412 fitted into a hole within the second portion 402 to secure the second portion 402 (and thereby, the impeller locking collar) to the shaft 416. In some examples, two or more set screws may be used. The complementary threads of the first portion and the second portion (420) may be, respectively, a male/female pair or a female/male pair. The ring element 414 may be a split ring, retaining ring, or a spiral lock. The split ring may include two complementary parts configured to surround the shaft.

A direction of the first set of threads and the second set of threads may be selected such that the first portion and the second portion move away from each other (tighten) in response to a vibration of the shaft during an operation of the pump. At least a segment of the first portion 404, the second portion 402, and the ring element 414 may be within a cavity of a head 418 portion distinct from a waterway cavity 406 of a pump casing to avoid exposure of the impeller locking collar parts and gaps associated with those to high speed fluids being transferred by the impeller. The separation may increase life expectancy and reliability of the pump by reducing a likelihood of failure due to solids in the pumped fluid getting stuck in gaps and reducing effectiveness of the impeller locking collar.

In assembling an example pump, the first portion 404 of the impeller locking collar may be fitted around the shaft 416 proximal to the base of the impeller 410 with the first set of threads facing the shaft first. Next, the second portion 402 of the impeller locking collar with its second set of threads facing the first portion may be fitted around the shaft 416 and partially between the first portion 404 and the shaft 416 by threading in the second portion 402. The ring element 414 may be positioned around the shaft 416 within the indentation of the second portion 402 distal to the base of the impeller 410 and the second portion 402 may be threaded out to push against the ring element 414 such that the ring element (e.g., split ring) receives the thrust load of the impeller 410 during an operation of the pump. Furthermore, at least one set screw 412 may be inserted into a hole within the second portion 402 to secure the second portion 402 (and thereby, the entire impeller locking collar) to the shaft 416.

Disclosed herein are methods and devices to maintain an impeller in axial position in the presence of axial thrust forces during an operation of a pump. The benefits of the presently disclosed pump assembly configurations are numerous. For example, the methods and devices employed herein enable pump life expectancy to be enhanced without modification of the thrust profile of the impeller with different diameter wear rings or similar approaches. Furthermore, dual anti-rotation measures of counter-thread direction and set screws ensure preservation of the thrust load mitigation in the presence of rotational and vibrational forces.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only and is not intended to be limiting.

The herein described subject matter sometimes illustrates different components contained within, or connected with, different other components. Such depicted architectures are merely examples, and in fact, many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. An impeller locking collar for a pump, the impeller locking collar comprising:
   a first portion configured to be fitted around a shaft of the pump proximal to a base of an impeller of the pump, the first portion comprising a first set of threads facing the shaft;
   a second portion configured to be fitted around the shaft and partially between the first portion and the shaft, the second portion comprising a second set of threads facing the first portion and an indentation distal to the base of the impeller, wherein the first set of threads and the second set of threads are arranged to mate in a direction counter to a rotation of the shaft; and
   a ring element comprising a split ring fitted around the shaft within the indentation of the second portion, the ring element configured to receive a thrust load of the impeller during an operation of the pump.

2. The impeller locking collar of claim 1, further comprising:
   at least one set screw fitted into a hole within the second portion, the at least one screw configured to secure the second portion to the shaft.

3. The impeller locking collar of claim 1, wherein the first set of threads are male and the second set of threads are female.

4. The impeller locking collar of claim 1, wherein the first set of threads are female and the second set of threads are male.

5. The impeller locking collar of claim 1, wherein the split ring comprises two complementary parts configured to surround the shaft.

6. The impeller locking collar of claim 1, wherein a direction of the first set of threads and the second set of threads is selected effective to cause the first portion and the second portion to move away from each other in response to a vibration of the shaft during an operation of the pump.

7. The impeller locking collar of claim 1, wherein at least a portion of the first portion, the second portion, and the ring element are within a cavity of a head portion distinct from a waterway cavity of a pump casing to avoid exposure to fluids being transferred by the impeller.

8. A centrifugal pump assembly comprising:
   a casing;
   an impeller positioned within a first cavity of the casing and configured to transfer a fluid between an intake opening of the pump assembly and an output opening of the pump assembly;
   a shaft coupled to the impeller and configured to rotate the impeller to transfer the fluid between the intake opening of the pump assembly and the output opening of the pump assembly, wherein a diameter of the shaft on an opposite side of the impeller relative to the side with the impeller locking collar is larger than a diameter of the shaft on the side of the impeller with the impeller locking collar; and
   an impeller locking collar fitted around the shaft in a second cavity of the casing to mitigate a residual thrust load of the impeller during an operation of the pump assembly, the impeller locking collar comprising:
      a first portion configured to be fitted around the shaft near a base of the impeller, the first portion comprising a first set of threads facing the shaft;
      a second portion configured to be fitted around the shaft and partially between the first portion and the shaft, the second portion comprising a second set of threads facing the first portion and an indentation distal to the base of the impeller, wherein the first set of threads and the second set of threads are arranged to mate in a direction counter to a rotation of the shaft; and
      a split ring element fitted around the shaft within the indentation of the second portion, the split ring element configured to receive a thrust load of the impeller during the operation of the pump assembly.

9. The pump assembly of claim 8, wherein the pump assembly is a multi-stage pump assembly and comprises another impeller coupled to the shaft in series with the impeller.

10. The pump assembly of claim 8, wherein the impeller locking collar further comprises:
    at least one set screw fitted into a hole within the second portion, the at least one screw configured to secure the second portion to the shaft.

11. The pump assembly of claim 8, wherein the split ring element comprises two complementary parts configured to surround the shaft.

12. The pump assembly of claim 8, wherein a direction of the first set of threads and the second set of threads is selected effective to cause the first portion and the second portion to move toward each other in response to a vibration of the shaft during an operation of the pump assembly.

13. A method to maintain an axial position of an impeller in a pump, the method comprising:
    fitting a first portion of an impeller locking collar around a shaft of the pump proximal to a base of the impeller, the first portion comprising a first set of threads facing the shaft, wherein a diameter of the shaft on an opposite side of the impeller relative to a side with the impeller locking collar is larger than a diameter of the shaft on the side of the impeller with the impeller locking collar;
    fitting a second portion of the impeller locking collar around the shaft and partially between the first portion and the shaft by threading in the second portion, the second portion comprising a second set of threads facing the first portion and an indentation distal to the base of the impeller, wherein the first set of threads and the second set of threads are arranged to mate in a direction counter to a rotation of the shaft;
    positioning a split ring element around the shaft within the indentation of the second portion; and
    threading out the second portion to push against the split ring element effective to cause the split ring element to receive a thrust load of the impeller during an operation of the pump.

14. The method of claim 13, further comprising:
    fitting at least one set screw into a hole within the second portion to secure the second portion to the shaft.

15. The method of claim 13, further comprising:
    fitting the first portion and the second portion within a cavity of a head portion distinct from a waterway cavity of a pump casing to avoid exposure to fluids being transferred by the impeller.

16. The method of claim 13, further comprising:
  selecting a direction of the first set of threads and the second set of threads effective to cause the first portion and the second portion to move toward each other in response to a vibration of the shaft during the operation of the pump.

* * * * *